United States Patent
Gretz

(10) Patent No.: US 7,347,401 B1
(45) Date of Patent: Mar. 25, 2008

(54) STACKABLE CABLE SUPPORT

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 64 days.

(21) Appl. No.: 11/199,522

(22) Filed: Oct. 12, 2005

(51) Int. Cl.
*F16L 3/22* (2006.01)

(52) U.S. Cl. .................. 248/68.1; 248/71; 248/72

(58) Field of Classification Search ............... 248/68.1, 248/71, 73, 65, 72, 49, 62, 226.12, 67.7, 248/230.6, 230.7, 316.7; 134/53, 50, 35; 211/49.1, 85.18, 126.12; 52/677; 24/17 AP, 24/16 R
See application file for complete search history.

(56) References Cited

U.S. PATENT DOCUMENTS

| | | | |
|---|---|---|---|
| 3,241,797 A | | 3/1966 | Anderson |
| 3,430,903 A | | 3/1969 | Mathes |
| 4,601,447 A | * | 7/1986 | McFarland ............... 248/49 |
| 4,907,766 A | * | 3/1990 | Rinderer .................. 248/57 |
| 5,201,484 A | * | 4/1993 | Thoen ..................... 248/68.1 |
| 5,612,509 A | * | 3/1997 | Market .................... 174/53 |
| 6,173,926 B1 | | 1/2001 | Elvegaard |
| 6,378,813 B1 | * | 4/2002 | Gretz ...................... 248/68.1 |
| 6,857,606 B1 | * | 2/2005 | Gretz ...................... 248/68.1 |
| 6,889,944 B2 | * | 5/2005 | Brandzel et al. ......... 248/68.1 |
| 6,945,735 B1 | * | 9/2005 | Doverspike ............ 405/184.4 |

\* cited by examiner

*Primary Examiner*—Brian E. Glessner
*Assistant Examiner*—Todd M. Epps

(57) ABSTRACT

A generally arch-shaped cable support having a portal suitable for the receipt of armored, metal-clad, or flexible metal cable. The cable support includes support legs and two sets of brace members having apertures therein. The apertures are suitable for the receipt of fasteners that permit attachment of the cable support to an underlying structure or to another cable support. According to a preferred embodiment, upward extending alignment walls are provided on one end of the upper surface of the arch-shaped support to assist with alignment of stacked supports. According to a further preferred embodiment, the interior curved section of the arch is provided with a tensioning tongue that engages the grooves in the metal cladding of an inserted cable to inhibit movement of the cable in the support.

1 Claim, 8 Drawing Sheets

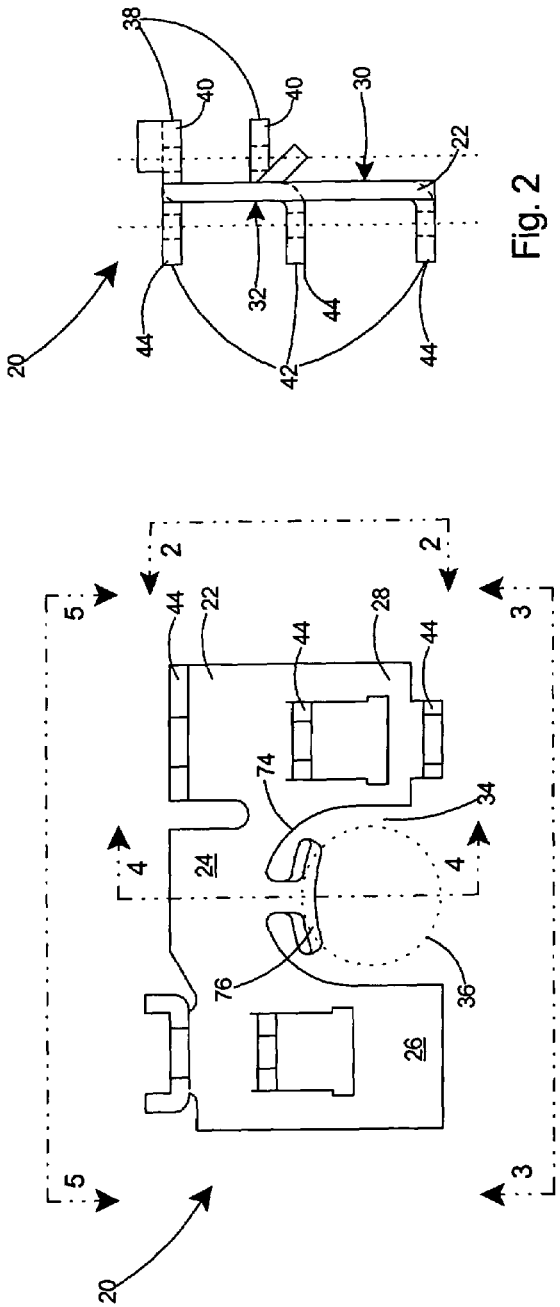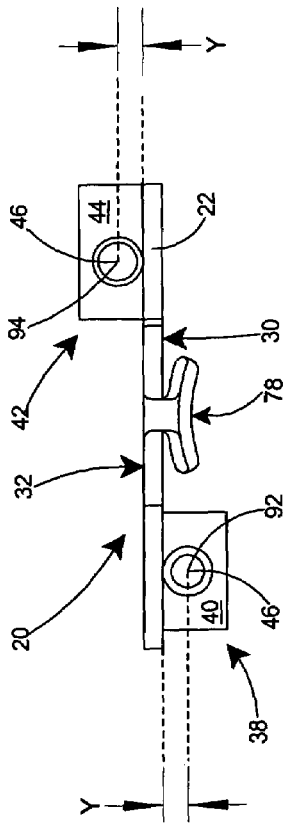

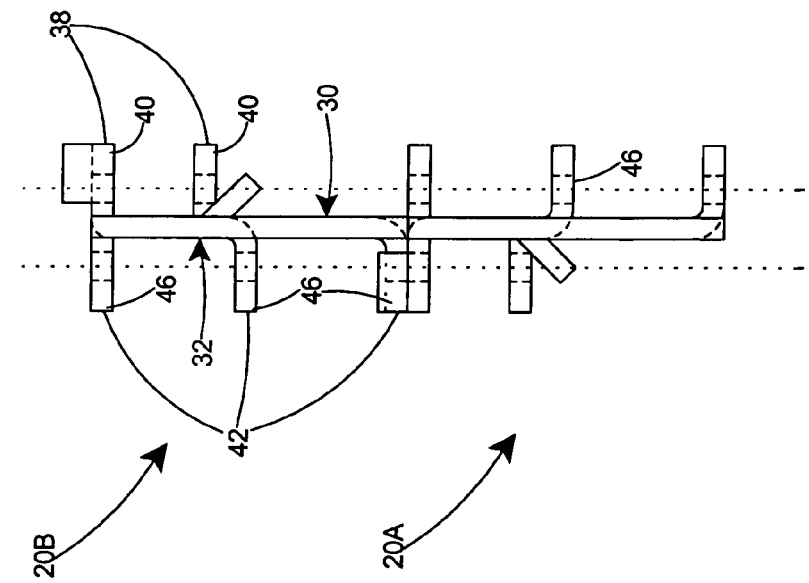
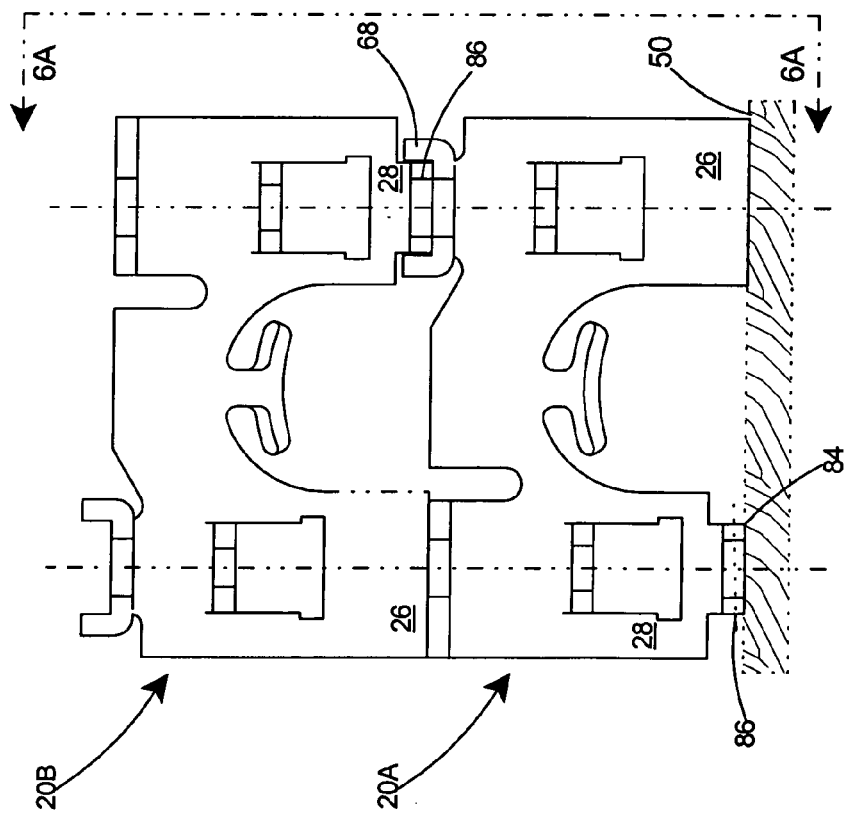

US 7,347,401 B1

STACKABLE CABLE SUPPORT

FIELD OF THE INVENTION

The present invention relates to a support for electrical cables and more specifically to such devices that, because of their design, are stackable.

BACKGROUND OF THE INVENTION

With the ever increasing usage of armored cable (AC), flexible metal cable (FMC), or metal clad (MC) cable in lieu of conduit contained cable or wiring for buildings of a commercial or industrial nature there has occurred a concomitant proliferation of devices to support such cable at the code required every ten feet and within one foot of a panel box.

While existing devices that generally comprise a simple metal strap with a fastener hole therein have proven adequate for supporting the cable, their installation sometimes proves difficult when a large number of cables are to be installed in a confined space. This is especially true because of code requirements that force location of such cable supports to a point at or near the center of a joist or stud. Consequently, there has arisen a need for a reliable cable support that permits easy supporting in a space where several cables are to be installed in parallel arrangement. One option in such cases is stacking the cables in a series of supports; however, currently utilized "strap-type" supports are not stackable.

OBJECT OF THE INVENTION

It is therefore an object of the present invention to provide a cable support that permits ready support of multiple cables, each in its own supporting structure, in a confined space.

SUMMARY OF THE INVENTION

The present invention provides a generally arch-shaped cable support having a portal suitable for the receipt of armored, metal-clad, or flexible metal cable. The cable support includes support legs and two sets of brace members having apertures therein. The apertures are suitable for the receipt of fasteners that permit attachment of the cable support to an underlying structure or to another cable support. According to a preferred embodiment, upward extending alignment walls are provided on one end of the upper surface of the arch-shaped support to assist with alignment of stacked supports. According to a further preferred embodiment, the interior curved section of the arch is provided with a tensioning tongue that engages the grooves in the metal cladding of an inserted cable to inhibit movement of the cable in the support.

DESCRIPTION OF THE DRAWINGS

FIG. 1 is a plan view of the cable support of the present invention.

FIG. 2 is an end view of the cable support taken along line 2-2 of FIG. 1.

FIG. 3 is a bottom view of the cable support taken along line 3-3 of FIG. 1.

FIG. 6 is a side view of two cable supports according to the present invention stacked on a supporting surface.

FIG. 6A is a side view of the stacked cable supports of FIG. 1 as viewed from line 6A-6A.

Figure 4:
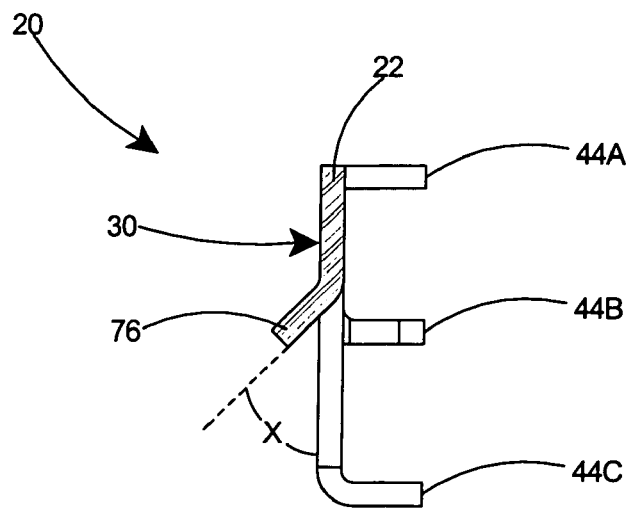
FIG. 4 is a sectional view of the cable support taken along line 4-4 of FIG. 1.

| Index to Reference Numerals in Drawings | |
|---|---|
| 20 | arch-shaped cable support |
| 20A | first cable support |
| 20B | second cable support |
| 20C | third cable support |
| 20D | fourth cable support |
| 22 | arch shaped member |
| 24 | top span |
| 26 | first support leg |
| 28 | second support leg |
| 30 | first side |
| 32 | second side |
| 34 | portal |
| 36 | electrical cable |
| 36A | first electrical cable |
| 36B | second electrical cable |
| 36C | third electrical cable |
| 36D | fourth electrical cable |
| 38 | first set of brace members |
| 40 | brace |
| 40A | first brace |
| 40B | second brace member |
| 42 | second set of brace members |
| 44 | brace member |
| 44A | upper brace |
| 44B | middle brace |
| 44C | lower brace |
| 46 | aperture |
| 48 | fastener |
| 50 | structural surface |
| 52 | upper portion of support leg |
| 54 | middle portion of support leg |
| 56 | lower portion of support leg |
| 68 | parallel alignment walls |
| 70 | upper surface of upper brace |
| 72 | recessed area |
| 74 | inner arch surface |
| 76 | tensioning tongue |
| 78 | curved outer surface |
| 80 | blank |
| 84 | lower end of second support leg |
| 86 | necked-down area |
| 88 | head of fastener |
| 92 | axis of apertures in first set of brace members |
| 94 | axis of apertures in second set of brace members |
| X | angle |
| Y | offset of axis of aperture from side of arch shaped member |

DETAILED DESCRIPTION

The present invention is an arch-shaped cable support 20 for anchoring one or more electrical cables to a surface in a stacked configuration.

With reference to FIGS. 1 and 2, the preferred embodiment of the arch-shaped cable support 20 includes a substantially planar arch-shaped member 22 having a top span 24, a first support leg 26, and a second support leg 28. The arch-shaped member 22, which is typically formed from a flat blank metal blank, includes a first side 30 and a second side 32 (see FIG. 2). A portal 34, defined by the top span 24 and the support legs 26 and 28, provides a passageway for an electrical cable 36 therein. A first set 38 of brace members 40 extends from the first side 30 of the arch-shaped member 22 and a second set 42 of brace members 44 extends from the second side 32 of the arch-shaped member 22.

Referring to FIG. 3, apertures 46 are provided in each of the brace members 40 and 44. As shown in FIG. 2, the apertures 46 in each of the sets 38, 42 of brace members 40, 44 are in axial alignment.

Figure 7:
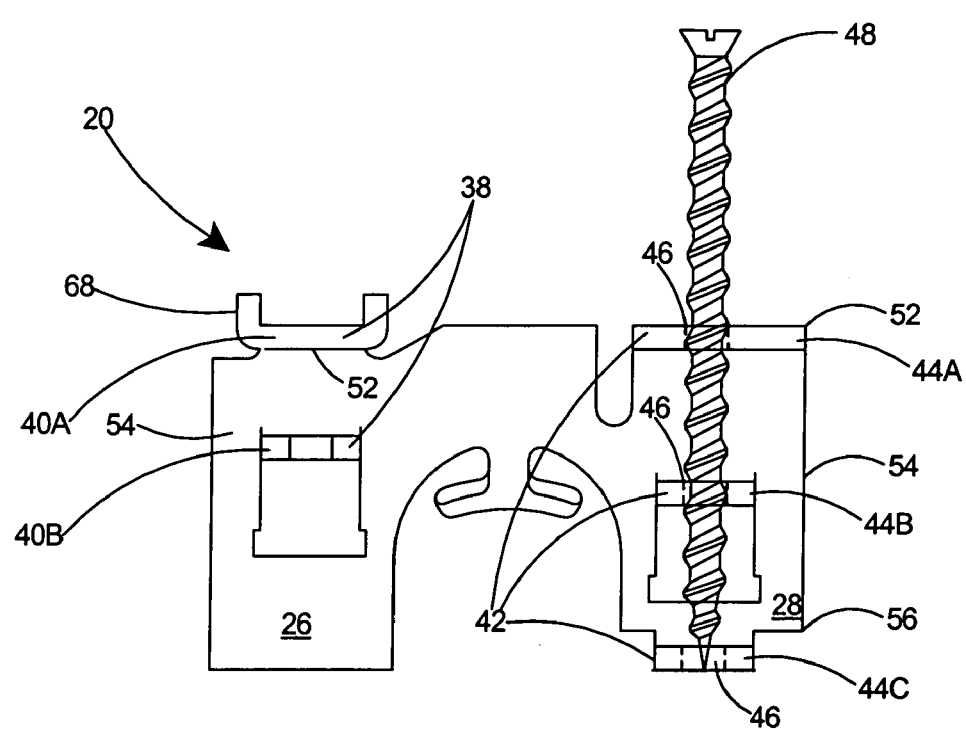
FIG. 7 is a side view of the cable support according to the present invention having a fastener frictionally held therein within the support.

With reference to FIG. 7, the axially aligned apertures 46 are capable of accepting a fastener 48 therein for securing the cable support 20 to a structural surface (not shown). The support legs include an upper portion 52, a middle portion 54, and a lower portion 56. The first set of brace members 38 includes a first brace 40A at the upper portion 52 of the first support leg 26 and a second brace 40B at the middle portion 54 of the first support leg 26. The second set of brace members 42 includes an upper brace 44A at the upper portion 52 of the second support leg 28, a middle brace 44B at the middle portion 54 of the second support leg 28, and a lower brace 44C at the lower portion 56 of the second support leg 28. The cable support 20 further includes parallel alignment walls 68 extending upward from the upper portion 52 of the first support leg 26.

Figure 5:
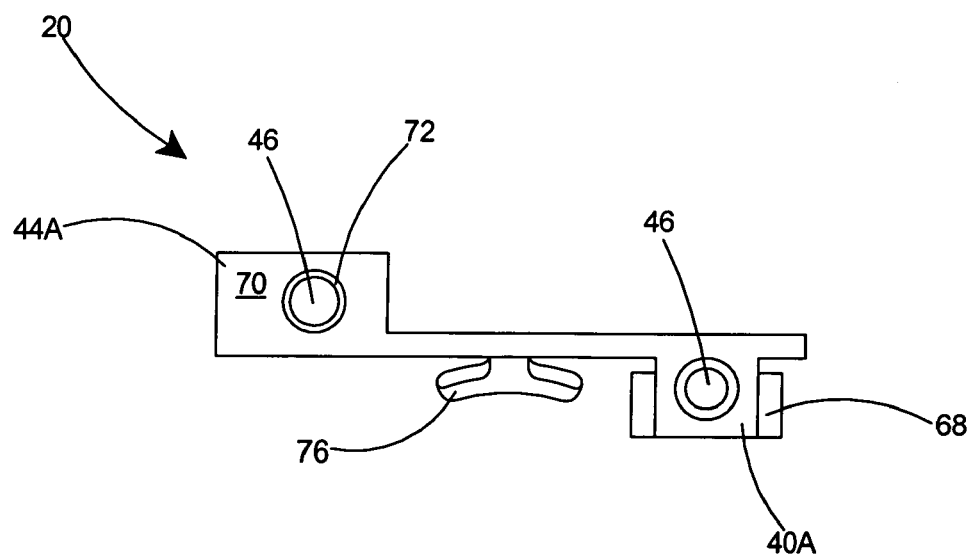
FIG. 5 is a top view of the cable support taken along line 5-5 of FIG. 1.

As shown in FIG. 5, the upper brace 44A includes an upper surface 70 and a recessed area 72 in the upper surface 70 with the recessed area concentric with the aperture 46 therein.

With reference to FIG. 1, the arch-shaped member 22 further includes an inner arch surface 74 and a tensioning tongue 76 extending from the inner arch surface 74 into the portal 34.

Referring to FIG. 4, the tensioning tongue 76 is bent outwards from the first side 30 of the arch-shaped member 22 by an angle X of at least 30 degrees and, most preferably, at an angle of 45 degrees. The tensioning tongue 76 includes a curved outer surface 78 as shown in FIG. 3.

Figure 11:
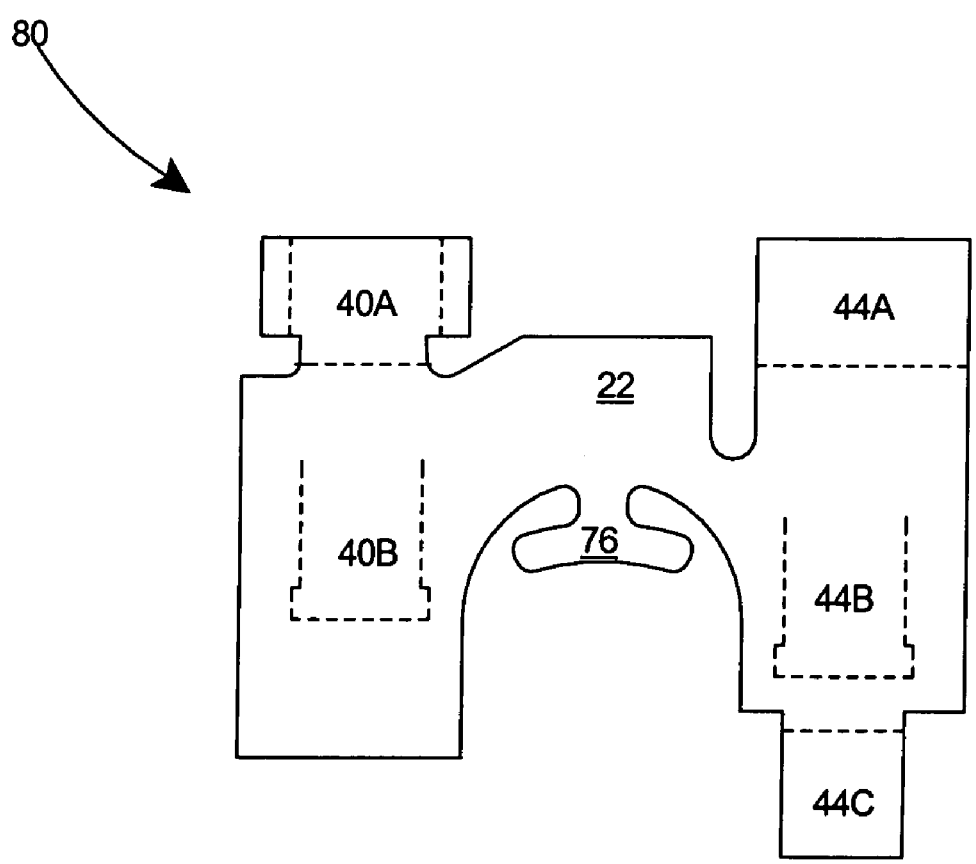
FIG. 11 is a plan view of a metal blank that is used to form the arch-shaped cable support of the present invention.

With reference to FIG. 11, the cable support 20 of the present invention is preferably constructed from a metal blank 80 and the blank is preferably is formed from sheet steel having a gauge of between 12 and 20. The arch-shaped member 22 remains in the plane of the blank and the brace members 40A, 40B, 44A, 44B, and 44C are bent outwards from the sides of the blank.

With reference to FIGS. 6 and 6A, the cable support further includes a lower end 84 on the second support leg 28 and a necked-down area 86 on the lower end 84. A first arch-shaped cable support 20A according to the present invention is rendered stackable with a second arch-shaped cable support 20B when the necked-down area 86 on the lower end 84 of the second support leg 28 of the second cable support 20B engages the parallel alignment walls 68 of the first support leg 26 of the first cable support 20A and the apertures 46 in the first set 38 and second set 42 of brace members of the first cable support 20A and the second cable support 20B are in axial alignment.

With reference to FIG. 7, the cable support 20 further includes a fastener 48 frictionally held in the axially aligned apertures 46 in the second set 42 of brace members.

Figure 8:
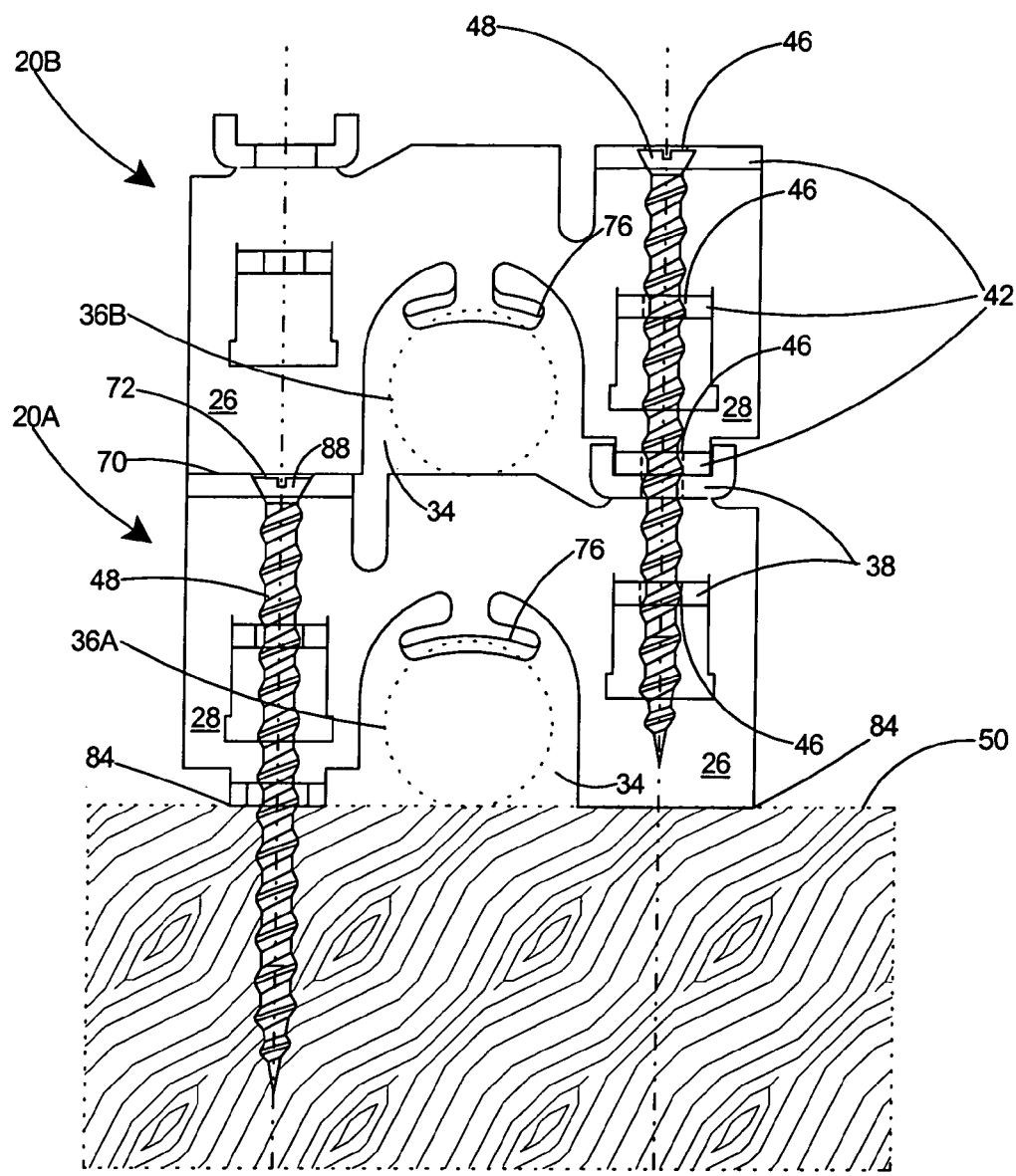
FIG. 8 is a side view similar to FIG. 6 showing two stacked cable supports and the fasteners securing the cable supports together and to a supporting surface.

With reference to FIG. 8, when securing multiple electrical cables with the present invention, a first arch-shaped cable support 20A is rendered stackable and connectable with a second arch-shaped cable support 20B when the second cable support 20B is rotated 180 degrees to the first cable support 20A and the axially aligned apertures 46 in the first set 38 of brace members of the first cable support 20A are aligned with the axially aligned apertures 46 in the second set 42 of brace members in the second cable support 20B. When an electrical cable is secured within the portal 34, as shown in FIG. 8, the cable is held securely by the tensioning tongue 76, which is biased outwards of its unbiased angle with respect to the cable support. As the cable support is typically constructed of steel, the tensioning tongue 76 has resilience and is typically pressed outwards by the electrical cable. The stackable cable support of the present invention is capable of securely supporting armored, flexible metal, or metal-clad cable. For those electrical cables that include helically wound outer surfaces, the tensioning tongue 76 typically presses into a groove on the exterior of the cable and thereby holds it securely in place.

The operation of an arch-shaped cable support according to the present invention therefore provides the ability to secure electrical cables to a surface in a stacked configuration. Referring to FIG. 8, an installer would place a first cable support 20A onto a supporting structural surface 50 with the support legs 26 and 28 straddling an electrical cable 36A and the lower ends 84 of the support legs 26 and 28 on the surface 50. The fastener 48 frictionally held in the first cable support 20A is then tightened into the supporting surface 50 until the head 88 of the fastener 48 is driven into the recessed area 72 in the upper surface 70 of the cable support 20A. A second electrical cable 36B is then centered over the first cable support 20A and a second cable support 20B oriented 180 degrees with respect to the first cable support 20A. The second cable support 20B is then placed over the second electrical cable 36B and onto the first cable support 20A in such a manner that the axially aligned apertures 46 in the first support leg 26 of the first cable support 20A are in axial alignment with the axially aligned apertures 46 in the second support leg 28 of the second cable support 20B. The fastener 48 that is frictionally held in the axially aligned apertures 46 in the second set 42 of brace members in the second cable support 20B is then tightened into the axially aligned apertures 46 in the first set 38 of brace members of the first cable support 20A.

Figure 9:
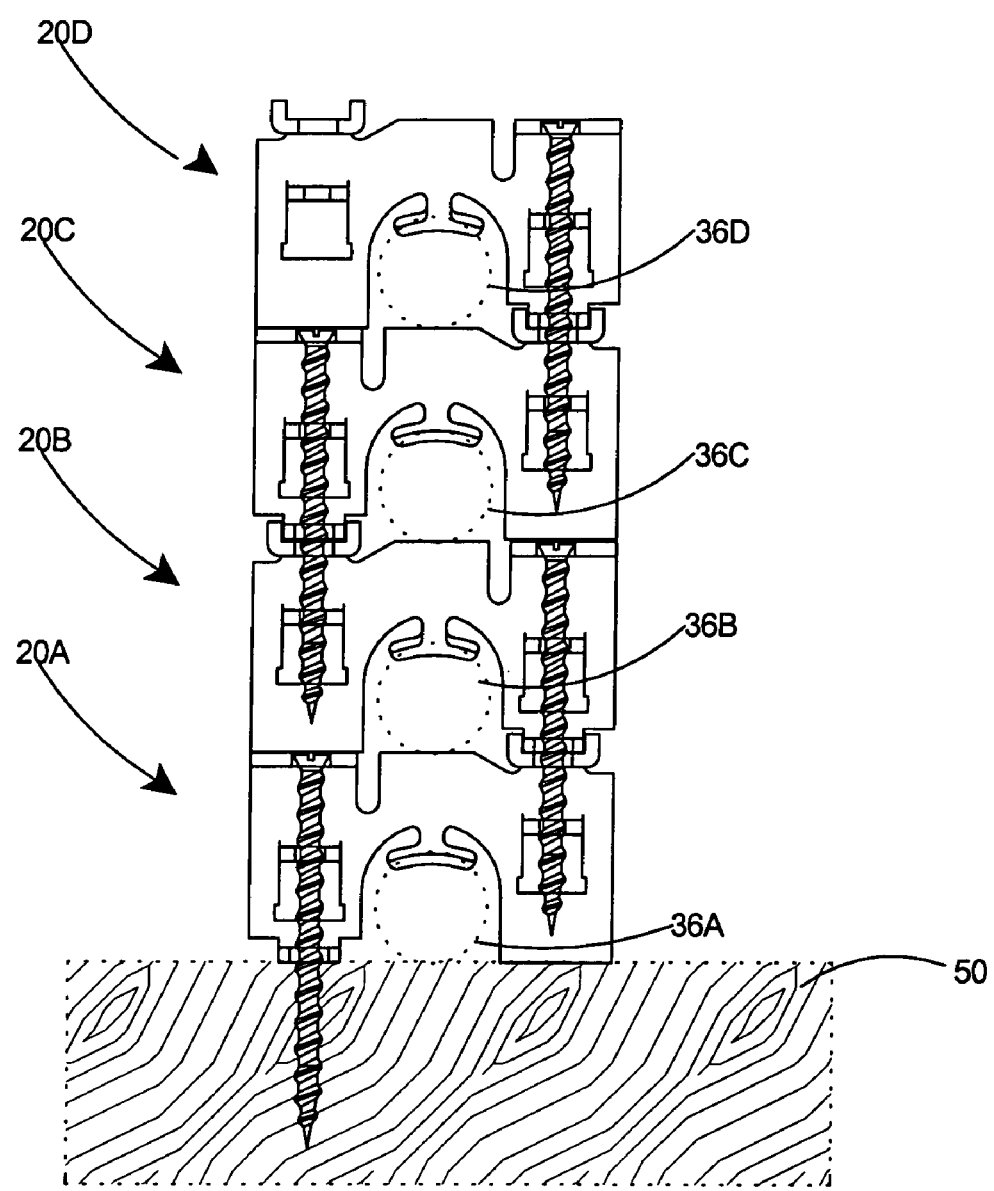
FIG. 9 is a side view of four stacked cable supports and the fasteners securing the cable supports together and to a supporting surface.

As shown in FIG. 9, in a like manner as described in the preceding paragraph, additional electrical cables 36C, 36D and cable supports 20C, 20D can be stacked on top of the previously secured cable supports 20A, 20B until the desired total of electrical cables are secured thereon to the surface 50. Practically, a total of five cable supports can be stacked together.

As shown in FIG. 7, the fastener 48 held frictionally within the cable support 20 of the present invention is preferably a screw. As the cable support of the present invention may be utilized to secure electrical cables to either wooden or metal studs or joists, the fastener can be varied to suit the particular medium it will be used with.

Figure 10:
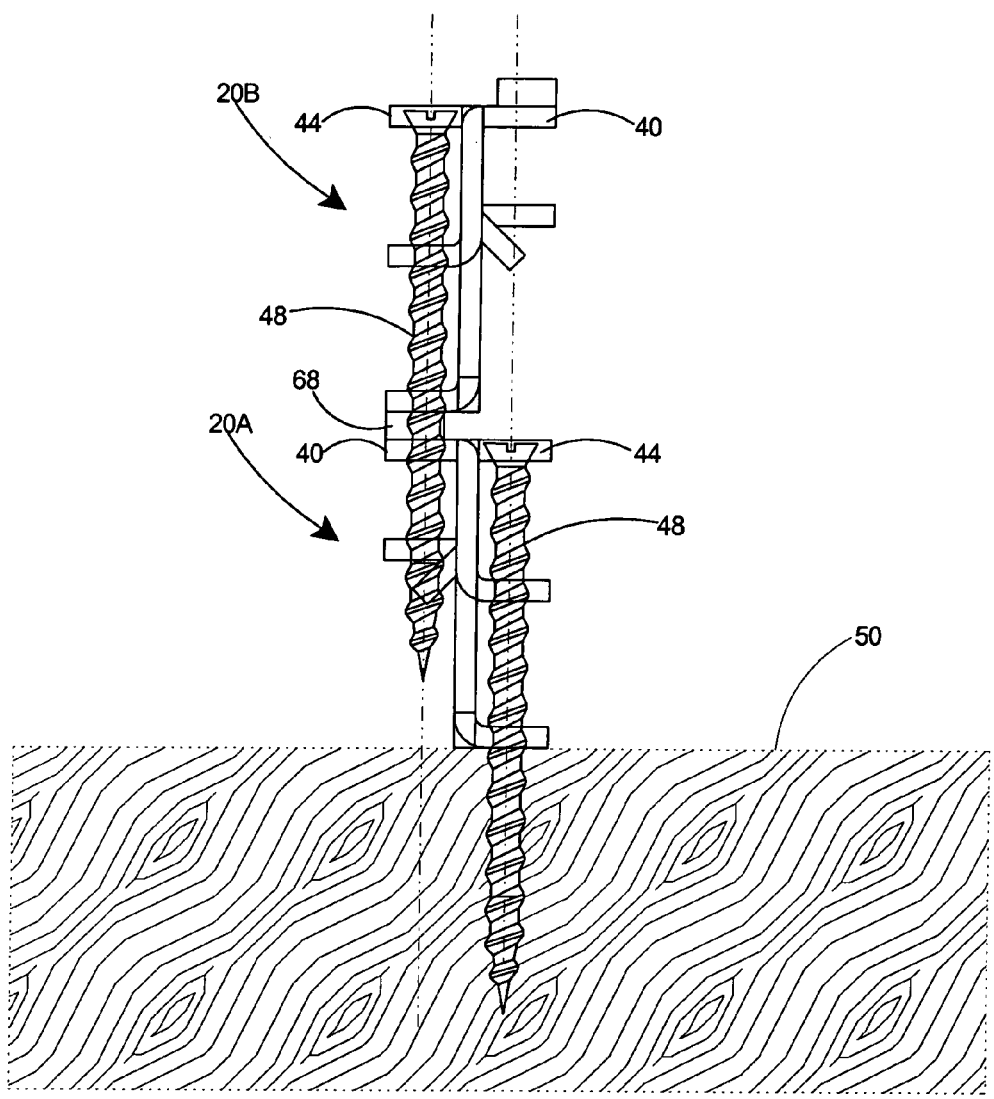
FIG. 10 is an end view of the two stacked cable supports of FIG. 8 as viewed from the right side of the figure.

With reference to FIG. 3, the apertures 46 aligned along axis 92 in the first set of brace members 38 are offset, as denoted by distance Y, from the first side 30 of the arch shaped member 22 and the apertures 46 aligned along axis 94 in the second set of brace members 42 are offset, as denoted by distance Y, from the second side 32 of the arch shaped member 22. Orienting a second cable support 20B at 180 degrees with respect to a first cable support 20A, such as shown in FIG. 10, therefore enables axial alignment of the apertures 46 in the two cable supports 20A and 20B.

Although the preferred embodiment of the cable support has been shown and described herein as being secured to a horizontal surface, it should be apparent that the cable support can just as easily be mounted to a vertical surface, or a surface at any other angle. The cable support described herein could also easily be attached to overhead rafters or the like to secure cables thereto.

As the invention has been described, it will be apparent to those skilled in the art that the same may be varied in any ways without departing from the spirit and scope of the invention. Any and all such modifications are intended to be included within the scope of the appended claims.

What is claimed is:

1. A cable support for anchoring one or more cables to a surface, said cable support comprising:
    a substantially arch-shaped member including a central planar body portion, a top span, and first and second support legs;
    said support legs including an upper portion, a middle portion, and a lower portion;
    a first side and a second side on said planar body portion;
    a portal for passage of cable defined by said top span and said support legs;
    a first set of brace members extending laterally from said first side of said planar body portion;
    said first set of brace members including a first brace at said upper portion of said first support leg and a second brace at said middle portion of said first support leg;
    a second set of brace members extending laterally from said second side of said planar body portion, said second set of brace members including a lower brace at said lower portion of said second support leg;
    apertures in said first and second sets of brace members;
    a tensioning tongue extending from said top span into said portal;
    said apertures in each of said sets of brace members in axial alignment; and
    said axially aligned apertures capable of accepting a fastener therein for securing said cable support to said surface.

* * * * *